United States Patent
Hunt

[19]

[11] Patent Number: 6,155,982
[45] Date of Patent: Dec. 5, 2000

[54] MULTIPLE SUB-ARRAY TRANSDUCER FOR IMPROVED DATA ACQUISITION IN ULTRASONIC IMAGING SYSTEMS

[76] Inventor: Thomas J Hunt, 4 Christopher La., Pelham, N.H. 03076

[21] Appl. No.: 09/289,681

[22] Filed: Apr. 9, 1999

[51] Int. Cl.[7] .................................................. A61B 8/14
[52] U.S. Cl. .................................... 600/459; 29/25.35
[58] Field of Search ................... 600/459, 443, 600/444, 447; 29/25.35; 310/327; 73/626

[56] References Cited

U.S. PATENT DOCUMENTS

| | | |
|---|---|---|
| 3,496,617 | 2/1970 | Cook et al. . |
| 3,587,561 | 6/1971 | Ziedonis . |
| 3,718,898 | 2/1973 | Cook et al. . |
| 3,952,387 | 4/1976 | Iinuma et al. . |
| 4,117,074 | 9/1978 | Tiersten et al. . |
| 4,211,948 | 7/1980 | Smith et al. . |
| 4,211,949 | 7/1980 | Brisken et al. . |
| 4,217,684 | 8/1980 | Brisken et al. . |
| 4,281,550 | 8/1981 | Erikson . |
| 4,385,255 | 5/1983 | Yamaguchi et al. . |
| 4,404,489 | 9/1983 | Larson, III et al. . |
| 4,462,092 | 7/1984 | Kawabuchi et al. . |
| 4,470,308 | 9/1984 | Hayakawa et al. . |
| 4,479,069 | 10/1984 | Miller . |
| 4,576,045 | 3/1986 | Miller-Jones . |
| 4,686,408 | 8/1987 | Ishiyama . |
| 4,734,963 | 4/1988 | Ishiyama . |
| 4,798,210 | 1/1989 | Ledley ................................ 600/437 |

FOREIGN PATENT DOCUMENTS 1530783  11/1978  United Kingdom .

*Primary Examiner*—Marvin M. Lateef
*Assistant Examiner*—Ali M. Imam

[57] ABSTRACT

A transducer for use in an ultrasonic imaging system. The transducer includes a plurality of acoustically and electrically independent sub-arrays, wherein each sub-array includes a plurality of transmitting and receiving elements and a backing assembly. Each sub-array is capable of transmitting lines of ultrasonic energy and receiving echo lines containing information for generating an image concurrent with the operation of the other sub-arrays. The sub-arrays are mounted onto the backing assembly to form a single mechanical unit with the backing assembly providing electrical and acoustic isolation between the cub-arrays. An acoustic insulator is placed between each pair of adjacent sub-arrays to isolate each sub-array from adjacent sub-arrays.

3 Claims, 1 Drawing Sheet

MULTIPLE SUB-ARRAY TRANSDUCER FOR IMPROVED DATA ACQUISITION IN ULTRASONIC IMAGING SYSTEMS

TECHNICAL FIELD

The present invention relates to methods and apparatus for increasing the data acquisition rate of an ultrasonic imaging system and, in particular, a multiple sub-array transducer for increasing the data acquisition rate of an ultrasonic system.

BACKGROUND ART

Ultrasonic transducers and imaging systems are used in many medical applications and, 10 in particular, for the non-invasive acquisition of images of organs and conditions within a patient, typical examples being the ultrasound imaging of fetuses and the heart. Such systems commonly use a linear or phased array transducer having multiple transmitting and receiving elements to transmit and receive narrowly focused and "steerable" beams, or "lines", of ultrasonic energy into and from the body. The transmitted beams, or lines, are reflected from the body's internal structures as received beams, or lines, that contain information that is used to generate images of the body's internal structures.

In a typical application, such as cardiac scanning, a number of beams or lines are transmitted and received along a plurality of angles forming a sector, that is, a wedge shaped three dimensional volume of interest, wherein the angular width of a sector may be the full range of angles that the transducer is capable of generating and receiving, or a selected a portion of that range. The lines of a sector are typically then organized into "frames" wherein each frame contains data representing a volume of interest, that is, a sector, and may be further processed or viewed to extract or present the information of interest.

The sequence and timing in which the lines are acquired and the organization of lines into frames often depends upon the particular application and the information desired and is affected by such factors as the dynamics of the information that is being acquired, the time required to transmit and receive a line, the data processing necessary to extract the desired information, and the processing required to generate an image display of the information. For example, in certain types of cardiac scanning the frames may be organized so that each frame contains data representing the sector at a selected point in time in the cardiac cycle so that the dynamic operation of the heart in a volume of interest can then be observed by viewing successive frames.

In many applications, however, these requirements conflict or interact to product undesirable results. For example, one important application of ultrasonic imaging is color flow mapping wherein doppler information is extracted from the returning signals to generate images, or maps, of blood flow velocity in, for example, the chambers of a heart. Color flow mapping, however, requires multiple data acquisitions, typically 8 to 12 along each line, and the time required for each acquisition along a line is determined by the speed of ultrasound wave in the body and the maximum depth of the volume of interest from the transducer. As a result, one or all of the frame rate, that is, the rate at which data is acquired, the line density, that is, the granularity or sharpness of the map as determined by the number of lines used to generate the map, or the field of view, that is, the angular width and depth of the sector as determined by the number and length of the lines, are compromised.

The ultrasound imaging systems of the prior art, including color flow mapping systems, have addressed this problem in a number of ways, such as allowing the systems to be configured in operate in either or both of the "rapid burst" and "interleaved line" modes. In the "rapid burst" mode, the system transmits and receives a sequence or set of lines along a single direction, wherein the set of lines along a single direction is referred to as a "packet", and this process is repeated across the sector so that the set of all of the packets of the sector comprise a frame. This approach is advantageous in applications where the condition being observed is changing rapidly, such as in blood flow mapping of regions wherein the blood is fast flowing or wherein it is necessary to identify and map relatively short transients in the blood flow. In this instance, a frame represents a relatively small interval in time with respect to the cardiac cycle, but is sufficient in time to show blood movement.

In the "interleaved line mode" the system interleaves the acquisition of lines in a pattern among a sequence of two or more frames. This approach may be used, for example, where the condition being observed is relatively stable or repetitive over time, such as blood flow mapping in regions where blood is moving relatively slowly, so that longer sampling times are necessary in order to observe blood movement, or where it is not necessary to detect transient conditions. Because of the longer time required to observe a change in the observed condition, and thereby in order to save scanning time, a system will often not scan a full frame of lines in the interleaved line mode but instead will scan a selected sub-set of the lines comprising a frame of interest. This approach may also be used or where the flow of blood is too fast to capture using the "rapid burst" method, but repeats periodically with the cardiac cycle.

A significant limitation of systems requiring multiple acquisitions along each line, however, such as blood flow mapping systems or B-mode systems, is that the requirement for multiple acquisitions along each line limits the number of lines that can be acquired in an allowable time, even using "rapid burst" or "interleaved line" operation, thereby limiting the data acquisition rate of the system and, for example, the system resolution.

A recurring problem in ultrasonic imaging systems, therefore, is that many ultrasonic imaging applications have data acquisition requirements that may significantly compromise any of all of the frame rate, that is, the rate at which data is acquired, the line density, that is, the granularity or sharpness of the map, the field of view, that is, the angular width and depth of the sector, or the rate at which data may be presented to a viewer. One example that has been discussed above is color flow imaging, which requires multiple data acquisitions along each are enhanced by increases in the data acquisition rate. Color flow mapping as discussed above, for example, requires multiple data acquisitions along each line and, as also discussed above, the performance of a color flow mapping system can be significantly enhanced by an increase in the data acquisition rate. Yet another example is three dimensional (3D) imaging, which is typically performed by acquiring and storing two dimensional tomographic image slices to construct a body of data representing a three dimensional image that is subsequently processed to provide images along any plane through the imaged space. A typical 3D imaging system, for example, acquires 30 tomographic slices, each 60° wide and 16 cm deep, in order to generate a three dimension image and requires about 8 milliseconds to acquire each frame, giving approximately a 4 Hz update date. It is therefore apparent, that the implementation of a real time three dimensional imaging system would require a significant increase in the data acquisition rate.

As discussed above, the prior art has applied several methods for increasing the data acquisition rate in an ultrasound system, including the use multiple parallel receiving lines, multiple transmissions and non-consecutive scanning, in order to increase the data acquisition rate of an imaging system. It may be seen, however, that the above described techniques for increasing the data acquisition rate are ultimately limited by the number of simultaneous distinct transmission and reception lines that can be formed by a transducer without unresolvable or uncorrectable mutual interference between the lines or degradation of the data and the resulting image from, for example, spatial artifacts.

The present invention provides a solution to these and other problems of the prior art by increasing the number of transmission and reception lines that can be formed by a transducer.

SUMMARY OF THE INVENTION

The present invention is directed to a transducer for use in a ultrasonic imaging system for concurrently transmitting and receiving a plurality of transmitted and received lines of ultrasonic energy. According to the present invention, the transducer includes a plurality of acoustically and electrically independent sub-arrays wherein each sub-array including a plurality of transmitting and receiving elements, a backing assembly for mounting the sub-arrays to form a single mechanical unit wherein the backing assembly provides electrical and acoustic isolation between the sub-arrays, and between each pair of adjacent sub-arrays, an acoustic insulator between each pair of adjacent sub-arrays for acoustically isolating each sub-array from adjacent sub-arrays.

The transducer of the present invention may also include an actuating driver and an actuating member for mechanically scanning the transducer and a housing enclosing the transducer and the actuating driver and actuating member. The housing, in turn, may include an acoustic window for the transmission and reception of acoustic energy through the housing and for matching the acoustic transmission of the transducer to a body being scanned and a fluid filling a volume of the housing at least surrounding the transducer and between the transducer and the acoustic window for conducting acoustic energy between the transducer and the acoustic window and acoustically matching the transducer and the acoustic path between the transducer and the acoustic window.

Other features, objects and advantages of the present invention will be understood by those of ordinary skill in the art after reading the following descriptions of a present implementation of the present invention, and after examining the drawings, wherein:

BEST MODE FOR CARRYING OUT THE INVENTION

Figure 1:
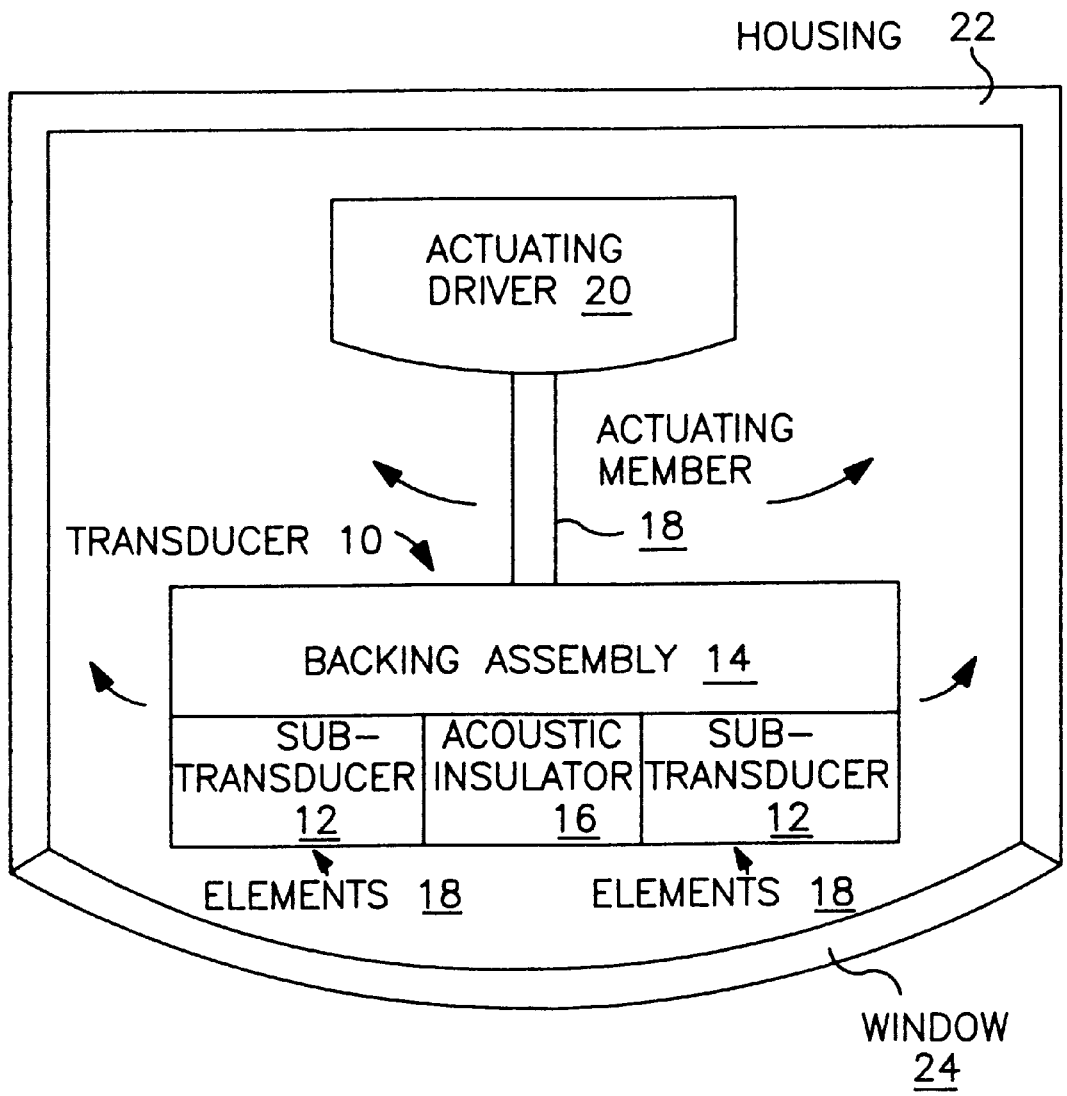
FIG. 1 is a diagrammatic illustration of a multi-beam parallel acoustic stack according to the present invention.

Referring to FIG. 1, therein is shown a diagrammatic representation of a transducer apparatus of the present invention for increasing the number of concurrent transmitting or receiving lines formed by an ultrasound transducer by constructing the transducer array as a plurality of acoustically and electrically independent sub-arrays. FIG. 1 represents and end view of a transducer of the present invention, that is, viewing the ends of the linear arrays of transducer elements comprising the transducer, so that only one element of each array appears in FIG. 1. As illustrated therein, a multi-array Transducer 10 is comprised of two or more Sub-Transducers 12 mounted onto a Backing Assembly 14 wherein each pair of Sub-Transducers 12 is separated and acoustically isolated from one another by an Acoustic Insulator 16. Each Sub-Transducer 12 is a sub-array of Elements 18 and, in the presently preferred embodiment, Sub-Transducers 12 are generally identical in construction and may contain, for example, 1/N of the number of Elements 18 found in a comparable single array transducer wherein N is the number of Sub-Transducers 12. A typical multi-array Transducer 10 may contain two Sub-Transducers 12 wherein each Sub-Transducer 12 is comprised of 64 Elements 18, thereby providing 128 transmitting and receiving lines and being comparable to an 128 element single array transducer. In this example, each Sub-Transducer 12 would be approximately 2 cm wide by 1 cm high.

Backing Assembly 14 is constructed, for example, boron nitrate loaded epoxy, and is designed to acoustically insulate the Sub-Transducers 12 from one another, thereby preventing a transmission line of one Sub-Transducer 12 from affecting a transmission or receiving line of another Sub-Transducer 92. Acoustic Insulators 16 are made, for example, epoxy, to acoustically isolate Sub-Transducers 12 from one another, and are approximately 1 cm wide in a typical application.

As illustrated schematically in FIG. 1, the Backing Assembly 14 of a multi-array Transducer 10 is mounted to an Actuating Member 18 which, in turn, is connected to an Actuating Driver 20 to mechanically scan Transducer 10 through an arc. Actuating Driver 20 may be implemented in a variety of ways well known in the art, such as a rotating electric, hydraulic or pneumatic motor, a limited rotation driver, that is, a motor-like unit having a limited angle of rotation rather than performing complete rotations, or a linear drive element, such as a piston or linear motor. In yet other implementation, Actuating Driver 20 may be located remotely from Actuating Member 18 and connected to Actuating Member 18 by, for example, a flexible drive shaft enclosed in a tube. Likewise, Actuating Member 18 may be implemented in a variety of ways well known in the art and, in part, dependent upon the implementation of Actuating Driver 20. For example, Actuating Member 18 may be a gear train or cam, an element of Actuating Driver 20, or a structural element connecting directly to Actuating Driver 20. Also, the arc through which Transducer 10 is scanned may be predetermined, or may be controlled by controlling the rotation or movement of Actuating Driver 20, while transmission and receiving lines may be generated and steered by Sub-Transducers 12 in the manner well known in the art.

Finally, Transducer 10 and Actuating Member 18 and possibly Actuating Driver 20 will be enclosed in a Housing 22 having an Acoustic Window 24 designed and constructed of a material selected for acoustic matching to the body being scanned, thereby facilitating the transmission and reception of the acoustic energy of the transmission and receiving lines. Also, at least that volume of Housing 22 surrounding Transducer 10 will typically be filled with a fluid selected to provide for the coupling and transmission of acoustic energy between the Transducer 10 and the body being scanned through Acoustic Window 24. As the selection of materials for and the design of such elements as Acoustic Window 24 and the fluid filling Housing 22 are well understood in the art, as is the design and construction of such elements as Backing Assembly 14 and Acoustic Insulators 16, Transducer 10 need not be described in further detail herein.

Lastly, while the invention has been particularly shown and described with reference to preferred embodiments of the apparatus and methods thereof, it will be also understood by those of ordinary skill in the art that various changes, variations and modifications in form, details and implementation may be made therein without departing from the spirit and scope of the invention as defined by the appended claims. Therefore, it is the object of the appended claims to cover all such variation and modifications of the invention as come within the true spirit and scope of the invention.

What is claimed is:

1. A transducer, for use in an ultrasonic imaging system, the transducer comprising:

a plurality of acoustically and electrically independent sub-arrays, each sub-array capable of transmitting lines of ultrasonic energy and receiving echo lines, containing information for generating an image, concurrent with the operation of the other sub-arrays, each sub-array including a plurality of transmitting and receiving elements, a backing assembly, the sub-arrays being mounted onto the backing assembly to form a single mechanical unit the backing assembly providing electrical and acoustic isolation between the sub-arrays, and between each pair of adjacent sub-arrays, an acoustic insulator acoustically isolating each sub-array from adjacent sub-arrays.

2. The transducer of claim 1, further comprising:

an actuating driver and an actuating member for mechanically scanning the transducer, and a housing enclosing the transducer and actuating member.

3. The transducer of claim 2 wherein the housing further comprises:

an acoustic window for the transmission and reception of acoustic energy through the housing and for matching the acoustic transmission of the transducer to a body being scanned, and a fluid filling volume of the housing at least surrounding the transducer and between the transducer and the acoustic window for conducting acoustic energy between the transducer and the acoustic window and acoustically matching the transducer and the acoustic path between the transducer and the acoustic window.

* * * * *